United States Patent
Cesareo et al.

(10) Patent No.: US 12,225,953 B2
(45) Date of Patent: Feb. 18, 2025

(54) METHOD OF TREATING A TEXTILE WITH GRAPHENE AND TEXTILE SO OBTAINED

(71) Applicant: DIRECTA PLUS S.P.A., Lomazzo (IT)

(72) Inventors: Giulio Giuseppe Cesareo, Milan (IT); Laura Giorgia Rizzi, Saronno (IT)

(73) Assignee: Directa Plus S.p.A., Lomazzo (IT)

( * ) Notice: Subject to any disclaimer, the term of this patent is extended or adjusted under 35 U.S.C. 154(b) by 162 days.

(21) Appl. No.: 17/927,770

(22) PCT Filed: May 24, 2021

(86) PCT No.: PCT/EP2021/063759
§ 371 (c)(1),
(2) Date: Nov. 25, 2022

(87) PCT Pub. No.: WO2021/239663
PCT Pub. Date: Dec. 2, 2021

(65) Prior Publication Data
US 2023/0243089 A1 Aug. 3, 2023

(30) Foreign Application Priority Data

May 25, 2020 (IT) .................. 102020000012262

(51) Int. Cl.
*B01D 71/02* (2006.01)
*A41D 13/11* (2006.01)
(Continued)

(52) U.S. Cl.
CPC ............ *A41D 13/11* (2013.01); *B01D 39/083* (2013.01); *B01D 39/1623* (2013.01); *B01D 39/2058* (2013.01); *B01D 71/0211* (2022.08); *B82Y 30/00* (2013.01); *D06B 3/18* (2013.01); *D06M 11/74* (2013.01); *D06M 16/00* (2013.01); *B01D 2239/0241* (2013.01);
(Continued)

(58) Field of Classification Search
CPC ............................. D06M 11/83; C01B 32/00
See application file for complete search history.

(56) References Cited

U.S. PATENT DOCUMENTS

2008/0083721 A1 4/2008 Kaiserman et al.
2010/0206863 A1 8/2010 Ritter
(Continued)

FOREIGN PATENT DOCUMENTS

CN 106637924 B * 5/2018 ............ D06M 11/09
CN 108824007 A * 11/2018 ............... D06B 3/18
(Continued)

OTHER PUBLICATIONS

Machine Translation CN111304911 (Year: 2020).*
(Continued)

*Primary Examiner* — Jennifer A Steele
(74) *Attorney, Agent, or Firm* — Patterson Intellectual Property Law, PC

(57) ABSTRACT

Method of treating a textile article by impregnation with a water dispersion of graphene nano-platelets in an impregnation bath comprising also a polymeric binder and an anti-migration and wetting agent. Graphene is fixed in the textile article to improve its thermal and electrical conductivity, as well as its filtering power and germ-blocking properties.

16 Claims, 1 Drawing Sheet

(51) Int. Cl.
  *B01D 39/08* (2006.01)
  *B01D 39/16* (2006.01)
  *B01D 39/20* (2006.01)
  *B82Y 30/00* (2011.01)
  *D06B 3/18* (2006.01)
  *D06M 11/74* (2006.01)
  *D06M 16/00* (2006.01)
  *D06M 101/20* (2006.01)
  *D06M 101/06* (2006.01)
  *D06M 101/32* (2006.01)
  *D06M 101/38* (2006.01)

(52) U.S. Cl.
  CPC ........... *B01D 2239/0258* (2013.01); *B01D 2239/0442* (2013.01); *B01D 2239/0464* (2013.01); *B01D 2239/0618* (2013.01); *B01D 2239/0627* (2013.01); *B01D 2239/10* (2013.01); *D06M 2101/06* (2013.01); *D06M 2101/20* (2013.01); *D06M 2101/32* (2013.01); *D06M 2101/38* (2013.01); *D06M 2200/00* (2013.01)

(56) References Cited

U.S. PATENT DOCUMENTS

| | | | |
|---|---|---|---|
| 2011/0268964 A1* | 11/2011 | Dornbusch | C09D 175/04 977/932 |
| 2013/0036802 A1 | 2/2013 | Johnson et al. | |
| 2015/0376014 A1* | 12/2015 | Cesareo | C09D 7/45 252/75 |
| 2016/0374411 A1 | 12/2016 | Brooks et al. | |
| 2017/0190581 A1 | 7/2017 | Cesareo et al. | |
| 2017/0196513 A1 | 7/2017 | Longinotti-Buitoni et al. | |
| 2020/0087850 A1 | 3/2020 | Wu et al. | |
| 2022/0411993 A1 | 12/2022 | Rizzi et al. | |

FOREIGN PATENT DOCUMENTS

| | | | | |
|---|---|---|---|---|
| CN | 111304911 A | * | 6/2020 | ........... D06M 11/38 |
| EP | 2570462 A1 | | 3/2013 | |
| KR | 1020170055443 A | | 5/2017 | |
| KR | 2019081357 A | * | 7/2019 | ............... D06B 1/14 |
| WO | 2004024436 A1 | | 3/2004 | |
| WO | 2015193268 A1 | | 12/2015 | |
| WO | 2018055005 A1 | | 3/2018 | |
| WO | WO-2018165704 A1 | * | 9/2018 | ........... A61B 5/6804 |
| WO | 2018202747 A1 | | 11/2018 | |
| WO | 2020191411 A1 | | 10/2019 | |
| WO | 22019202028 A1 | | 10/2019 | |

OTHER PUBLICATIONS

Machine Translation CN106637924 (Year: 2017).*
Machine Translation KR2019081357 (Year: 2019).*
Machine Translation CN108824007 (Year: 2018).*
International Search Report: European Patent Office Search Report for corresponding International application No. PCT/EP2021/063759 dated Sep. 15, 2021, 5 pages.

* cited by examiner

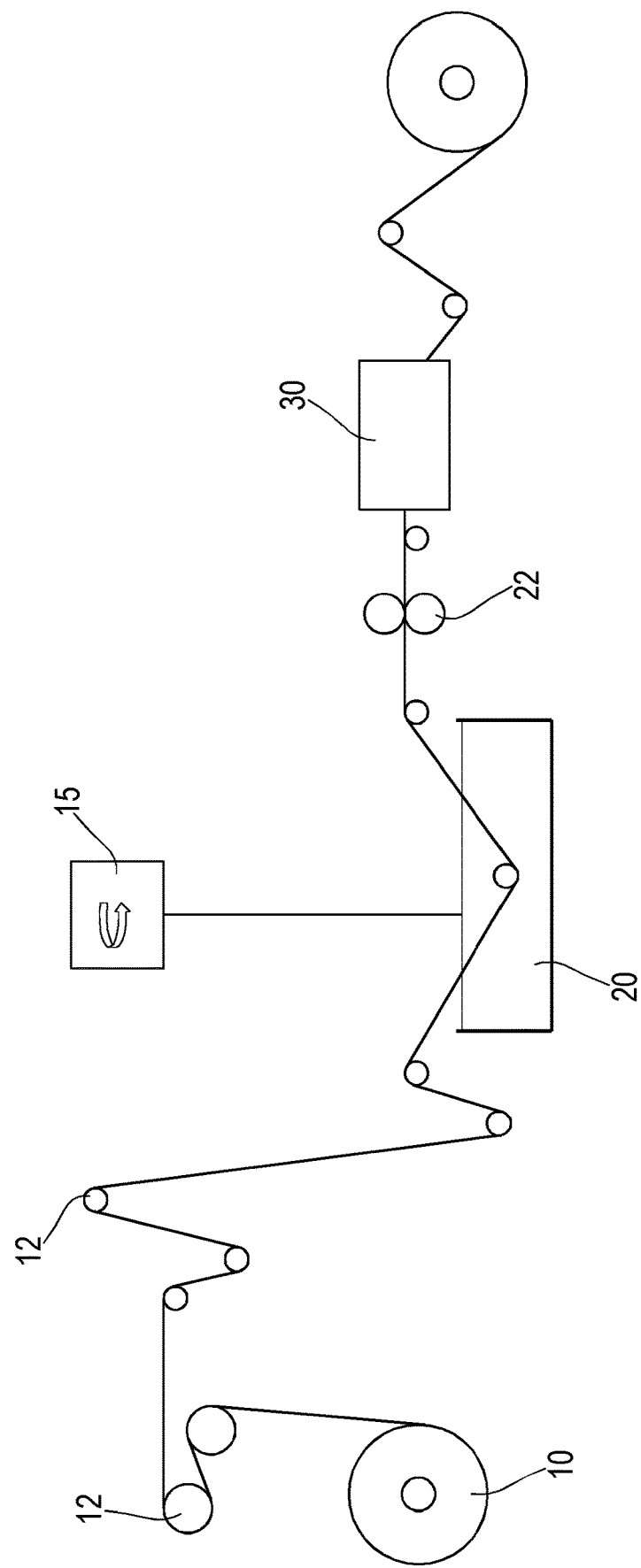

METHOD OF TREATING A TEXTILE WITH GRAPHENE AND TEXTILE SO OBTAINED

The present invention relates to method of treating a textile article with graphene to modify certain properties of the textile article, and to the textile article obtained by the method.

BACKGROUND OF THE INVENTION

Textile articles, or generally textiles, find applications in various commercial sectors in which new or improved properties are required or desirable. For instance, textiles are typically made of insulating materials, which show disadvantages in several applications, such as clothing items or furnishing items.

Modifying insulating articles, such as films, polymer membranes and textile articles, into electrically and/or thermally conductive articles by applying conductive inks is known.

The patent literature describes conductive inks comprising graphene or graphene derivatives to create conductive circuits on polymeric films and articles comprising said film.

WO 2018/055005 A1 describes flexible electronic components and methods for their production. The flexible electronic components comprise a textile substrate onto which a smoothing layer and a layer of nanoplatelets, for example graphene, are deposited; electrodes are subsequently applied to the latter. In this way, articles defined as "wearable electronics" are obtained.

WO2019/202028 A1 describes a textile article containing graphene in a composition that is deposited on the article so as to form a thermally conductive circuit, which also exhibits limited electrical conductivity.

Electrical and/or thermal conductivity are just an example of properties of textiles that, depending on the filed of use of the textile article, it may be desirable to improve. Other properties, such as filtering power and blocking of germs and bacteria are becoming increasingly important in many applications of textiles.

Therefore, a need exists for a method of modifying the properties of textile articles with respect to conductivity, electrical or thermal or both, and with respect to filtering and germ-blocking properties.

The prior art embodiments do not provide an optimal solution to these needs.

SUMMARY OF THE INVENTION

Therefore, an object of the present invention is to provide a method for increasing the electrical and/or thermal conductivity of a textile article that is effective, simple and economically advantageous.

Another object of the present invention is to provide a method that for increasing filtering power and the germ-blocking properties of a textile article.

Therefore, an aspect of the present invention concerns a method for increasing the electrical and/or thermal conductivity, as well as the filtering power and the germ-blocking properties of a textile article, characterized by comprising the following steps:
(A) Preparing an impregnation composition consisting of a water dispersion comprising:
   a) from 1 to 65 g/L of graphene consisting of graphene nanoplatelets, in which at least 90% have a lateral dimension (x, y) from 50 to 50000 nm and a thickness (z) from 0.34 to 50 nm;
   b) from 10 to 500 g/L of a polymeric binder,
   c) from 1 to 50 g/L of an anti-migration and wetting agent,
(B) Continuously stirring said impregnation composition in a stirring tank;
(C) Feeding said impregnation composition into an impregnation tank to form an impregnation bath in said impregnation tank;
(D) Providing a textile article in the form of a roll, unwinding said roll and passing said textile in said impregnation bath until it is impregnated;
(E) Passing said impregnated textile article through at least a couple of squeezing rolls to remove excess impregnation bath; and
(F) Treating said textile article in an oven to dry it at a temperature of between 100 and 200° C. to fix said composition on said textile.

According to an aspect of the present invention, the method of treating a textile further comprises a finish step (G) to improve fastness:
(G) Passing the textile article leaving step (F) through a finish bath in a finish tank, the finish bath comprising a fixing agent dispersed in water in an amount of from 1 to 300 g/L, preferably from 2 to 250 g/L;
(H) Passing said textile article leaving said finish bath through a couple of squeezing rolls to remove excess finish bath; and
(I) Treating said textile article in an oven to dry it at a temperature of between 100 and 200° C. to fix said fixing agent on said textile.

A further aspect of the present invention concerns a textile article having an increased electrical and/or thermal conductivity, and/or an increased filtering power and/or germ-blocking properties comprising the dry composition obtained at the end of step (F) as defined above.

BRIEF DESCRIPTION OF THE DRAWINGS

The invention will now be described also with reference to FIG. 1, which is a schematic view of the method according to the invention.

DETAILED DESCRIPTION OF THE INVENTION

According to the present invention, the terms "textile article" or "textile" are used interchangeably. They designate a substantially flat article selected from the group consisting of fabrics, nonwovens, and felts. The term "fabric" designates a textile that is obtained either by weaving or by knitting.

The term "textile article" or "textile" also comprises the combination of one or more of fabrics, nonwovens, and felts.

Fabrics

These are textiles obtained by weaving or knitting yarns, as is known in the art. Fabrics can be made of natural, artificial or synthetic fibre.

Nonwovens:

The nonwovens typically belong to the following categories:

Spunlace

This is a nonwoven deriving from a process called hydroentangling. The process uses high pressure water jets that perforate the fabric and intertwine the fibres giving the fabric greater substance. The consolidation of plies of fibres by means high pressure water jets causes these to perforate the fabric and intertwine the fibres without damaging them, as can occur with needle punching. Intertwining of the fibres in various directions gives the nonwoven an isotropic property and the same strength in various directions.

Spunbond

This is a nonwoven obtained by processing nonwoven synthetic fibres. The characteristic of this nonwoven is that of thermal point bonding the fibres. This characteristic mechanically bonds the fibres to one another and imparts the "point bonding" characteristic, which is usually square or oval and makes a fabric that is both soft and strong.

Felts

Another type of textile substrate that can be used in the method of the invention are felts, which consist of synthetic fibres tangled and consolidated so as to form a compact structure using mechanical operations, as is known in the art.

Examples of synthetic felts, with their typical weight, are:
100% polyester 500 g/m$^2$
100% polypropylene 450 g/m$^2$
100% polyester 350 g/m$^2$
100% polyester 340-380 g/m$^2$ As stated above, the method of the present invention is suitable to increase the electrical and/or thermal conductivity, as well as the filtering power and the germ-blocking properties of textiles.

Concerning the filtering and germ-blocking characteristics of textiles, they are assessed in relation to dusts, fumes and inhalable liquid mists (aerosols), and possibly also in relation to pathogenic microorganisms, such as bacteria, fungi and viruses. Examples of these filters are filters for domestic or industrial use, such as the filters used in air conditioning systems or used in exhaust hoods, both industrial and those for domestic kitchens. Other examples of filters are those designed for personal health protection, such as face masks and the like.

The method of the invention is carried according to the steps described below.

(A) Preparing an impregnation composition consisting of a water dispersion comprising:
　a) from 1 to 65 g/L of graphene consisting of graphene nanoplatelets, in which at least 90% have a lateral dimension (x, y) from 50 to 50000 nm and a thickness (z) from 0.34 to 50 nm;
　b) from 10 to 500 g/L of a polymeric binder,
　c) from 1 to 50 g/L of an anti-migration and wetting agent,
(B) Continuously stirring said impregnation composition in a stirring tank;
(C) Feeding said impregnation composition into an impregnation tank to form an impregnation bath in said impregnation tank;
(D) Unwinding a roll of textile and passing said textile in said impregnation bath until it is impregnated;
(E) Passing said impregnated textile through at least a couple of squeezing rolls to remove excess impregnation bath; and
(F) treating said textile in an oven to dry it at a temperature of between 100 and 200° C. to fix said composition on said textile.

FIG. 1 is a schematic view of the method according to the invention.

Step (A)

An impregnation composition is prepared in a stirring tank 15 by using the components and amounts defined in step (A) above.

Graphene

As to graphene, it comprises, or consists of, graphene nano-platelets in which at least the 90% have a lateral dimension (x, y) from 50 to 50000 nm and a thickness (z) from 0.34 to 50 nm.

Preferably, at least 90% of the graphene nano-platelets have a lateral dimension (x, y) from 100 to 10000 nm and a thickness (z) from 0.34 to 10 nm.

The graphene nanoplatelets preferably have a C/O ratio $\geq 100:1$.

The scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of patents and patent applications relating to production methods of structures comprising layers of graphene, such as EP 2 038 209 B1, WO 2014/135455 A1 and WO 2015/193267 A1. The last two patent applications cited describe production methods of pristine graphene dispersions, from which it is possible to obtain graphene nano-platelets with the dimension required for implementation of the present invention.

The ratio C/O $\geq 100:1$ is preferred as it defines the maximum amount of oxygen bonded to the carbon forming the graphene. In fact, the best properties of graphene, which derive from its high crystallographic quality, are obtained when the amount of oxygen is minimum.

A pristine graphene, i.e., with a C/O ratio $\geq 100$, and having the size characteristics defined previously, is produced and marketed by Directa Plus S.p.A. with the trade name G+®.

The C/O ratio in the graphene used in the textile article according to the invention is determined by means of elemental analysis performed by elemental analyzer (CHNS O), which provides the percentage by weight of the various elements. The C/O ratio is obtained by normalizing the values obtained with respect to the atomic weight of the C and O species and finding their ratio.

It was found that graphene in oxidized form, just as that in the form obtained through reduction of graphene oxide (GO), has different characteristics and properties to pristine graphene. For example, the electrical and thermal conductivity characteristics and the mechanical strength of pristine graphene are superior to those of GO and to the reduction product obtained therefrom, also due to the presence of numerous lattice defects and imperfections of the crystalline structure caused by the reduction reaction.

The lattice defects of the nano-platelets can be evaluated by Raman spectroscopy analyzing intensity and shape of the Peak D positioned at 1350 cm$^{-1}$.

According to preferred embodiments described in the patent documents mentioned above by the Applicant Directa Plus S.p.A., the continuous process for producing pristine graphene is carried out continuously feeding graphite flakes to the step of expansion at high temperature, continuously discharging the expanded graphite thus obtained in an aqueous medium and continuously subjecting the expanded graphite dispersed in the aqueous medium to exfoliation and size reduction treatment carried out with ultrasonication and/or high pressure homogenization methods.

As described in these patent documents, the final dispersion of graphene nano-platelets obtained can be concentrated or dried, according to the final form desired for the graphene.

The purpose of drying the dispersion is to obtain a dry powder that is easily re-dispersible in various matrices, both solvents and polymers, where liquid is not desirable or manageable at process level, or where water cannot be used due to chemical incompatibility.

A significant advantage of the production processes described in the patent documents WO 2014/135455 A1 and WO 2015/193267 A1 consists in the possibility of operating without using surfactants. In fact, the graphene nano-platelets thus obtained are pristine, both due to the high C/O ratio and to the absence of extraneous substances, such as surfactants, which could contaminate them. In fact, it was found that in the absence of surfactants it is possible to obtain graphene having an electrical conductivity substantially higher than that of graphene obtained with processes using surfactants. This improves the performance of graphene in a plurality of applications.

Pristine graphene nano-platelets, at least 90% of which have a lateral dimension (x, y) from 50 to 50000 nm and a thickness (z) from 0.34 to 50 nm, with a C/O ratio ≥100:1, have a high electrical conductivity. It was also seen that when a dispersion of graphene nano-platelets is formed in the presence of a surfactant, this deposits on the surface thereof and tends to promote its tangling.

In the present description the dimensions of the graphene nano-platelets are defined with reference to a system of Cartesian axes x, y, z, it being understood that the particles are substantially flat platelets but can also have an irregular shape. In any case, the lateral dimension and the thickness provided with reference to the directions x, y and z are meant as the maximum dimensions in each of the aforesaid directions.

The lateral dimensions (x, y) of the graphene nano-platelets are determined, within the scope of the production process described above, by direct measurement on the scanning electron microscope (SEM), after having diluted the final dispersion in a ratio of 1:1000 in deionized water and having added it dropwise to a silicon oxide substrate placed on a plate heated to 100° C.

Alternatively, if nano-platelets in dry state are available, SEM analysis is carried out directly on the powder deposited on a double-sided adhesive carbon tape.

In both cases the measurement is carried out on at least 100 nano-platelets.

The thickness (z) of the graphene nano-platelets is determined with the atomic force microscope (AFM), which is essentially a profilometer with subnanometer resolution, widely used for the characterization (mainly morphological) of surfaces and of nanomaterials. This type of analysis is commonly used to evaluate the thickness of graphene flakes, produced using any method, and thus find the number of layers of which the flake is composed (single layer=0.34 nm).

The thickness (z) can be measured using a dispersion of nano-platelets diluted in a ratio of 1:1000 in isopropanol, from which 20 ml is collected and sonicated in an ultrasonic bath (Elmasonic S40) for 5 minutes. The nano-platelets are then deposited as described for SEM analysis and are scanned directly with an AFM tip, where the measurement provides a topographical image of the graphene flakes and their profile with respect to the substrate, enabling precise measurement of the thickness. The measurement is carried out on at least 50 nano-platelets.

Alternatively, if nano-platelets in dry state are available, the powder is dispersed in isopropanol at a concentration of 2 mg/L. An amount of 20 ml is collected and sonicated in an ultrasonic bath (Elmasonic S40) for 30 minutes. The nano-platelets are then deposited as described for SEM analysis and are scanned by AFM.

In the concentrated final dispersion or in the dry form obtained after drying, at least 90% of the graphene nano-platelets preferably have a lateral dimension (x, y) from 50 to 50000 nm and a thickness (Z) from 0.34 to 50 nm, and a C/O ratio ≥100:1. Preferably, at least 90% of the graphene nano-platelets have a lateral dimension (x, y) from 100 to 10000 nm and a thickness (z) from 0.34 to 10 nm, more preferably a lateral dimension (x, y) from 200 to 8000 nm, and even more preferably from 500 to 5000 nm, and preferably a thickness (z) from 0.34 to 8 nm, more preferably from 0.34 to 5 nm.

The graphene nano-platelets, hereinafter also referred to as GNPs, having the aforesaid characteristics, and not functionalized with other molecules, proved to be particularly suitable for the impregnation of textiles to obtain a textile article having excellent filtering and antibacterial properties. Moreover, the graphene uniformly distributed on the textile article forms an electric and/or thermal circuit capable of optimally managing the heat absorbed by the circuit and avoid electrostatic charges.

A dispersion of solid and hydrophobic particles within a liquid, such as that of GNPs in a water-based dispersion, tends to settle and the solid particles tend to re-aggregate to form larger particles.

Preferred amount of graphene nano-platelets in the impregnation composition is from 2 to 40 g/L.

Polymeric Binder

Preferably the polymeric binder b) is selected from the group consisting of polyurethanes, polybutadiene, polyacrylates, including copolymers of acrylic acid.

Emulsions of acrylic polymers and copolymers are preferred.

Polymeric binders used for pigment dyeing can be used in the present method.

Preferred amount of polymeric binder in the impregnation composition is from 50 to 300 g/L.

Anti-Migration and Wetting Agent

The anti-migration and wetting agent c) prevent the uncontrolled migration of the graphene nano-platelets mainly caused by physical phenomena occurring during the process, thus ensuring homogeneous distribution of graphene. It also helps the impregnation bath to penetrate in the textile.

Anti-migration and wetting agent used for pigment dyeing can be used in the present method.

Preferred amount of anti-migration and wetting agent in the impregnation composition is from 5 to 40 g/L.

Step (B)

The impregnation composition is continuously stirred in a stirring tank 15. It has been found that this composition allows keeping the graphene nano-particles in suspension in water, although this was not predictable due to the hydrophobic nature of graphene.

The impregnation composition is preferably kept at a temperature from 10 to 30° C.

GNPs are a hydrophobic material with a low affinity with water. According to the method of the invention, however, a very fine and homogeneous dispersion of the GNPs in the water medium is obtained, so as to reduce sedimentation and re-aggregation of the particles.

Step (C)

The impregnation composition is withdrawn from the stirring tank 15 and fed to an impregnation tank 20 to form an impregnation bath in the impregnation tank.

The impregnation bath is preferably kept at a temperature from 10 to 30° C.

Step (D)

A textile to be treated is unwound from roll 10 and pulled by a series of rolls which guide it into an impregnation tank 20, in which the textile is passed through the impregnation bath until it is impregnated.

The residence time of the textile in the impregnation bath is selected to impregnate the textile with a desired amount of bath, called "pick-up". The Pick-up is defined as:

(weight of the textile after impregnation−weigth of the textile before impregnation/weight of the textile before impregnation)×100.

A preferred pick-up is from 20 to 95%, more preferably from 30 to 90%.

The textile passes through the impregnation bath at a speed of from 3 to 70 metre/min, preferably of from 5 to 60 metre/min, depending on the desired pick-up.

Step (E)

After the impregnation step the textile leaves the impregnation tank and passes through a couple of squeezing rolls to remove excess impregnation bath.

Step (F)

The impregnated textile is introduced in an oven 30 to dry it at a temperature of between 100 and 200° C. and to fix the graphene nano-platelets on and within the structure of the textile.

In the method according to the invention, step (F) is preferably carried out by keeping the textile in the oven 30 for a period greater than 30 seconds, preferably between 1 and 10 minutes.

Step (F) is preferably carried by heating the textile article in an oven at an increasing temperature comprised between 100 and 200° C., preferably between 120 and 180° C.

The textile is then wound again as a roll.

According to another embodiment of the method of the invention, the textile leaving the oven 30 at the end of Step (F) is treated to improve fastness, according to the following steps:

Step (G)

The textile is unwound from the roll and passed through a finish bath in a finish tank, the finish bath comprising a fixing agent dispersed in water in an amount of from 1 to 300 g/L, preferably from 2 to 250 g/L.

The fixing agent typically comprises an emulsion of one or more terpolymers.

A fixing agent used to improve the wet fastness of textiles in dyeing processes can be used in the present method. A preferred fixing agent is Achifix MBH Conc.

GNPs are a material characterized by an opaque and dark gray color. When a textile is impregnated with GNPs, especially with a high pick-up, there is a risk of release of GNPs which can dirty what comes in contact with the textile. Step (G) reduces the risk release of material GNPs.

Step (H)

The textile leaving the finish bath and passes through a couple of squeezing rolls to remove excess finishing bath, as described in Step (E).

Step (I)

The textile is then introduced again in the oven 30 to dry it at a temperature of between 100 and 200° C. and to improve the fastness of the textile containing the graphene nano-platelets and the fixing agent.

Step (I) is preferably carried out at the same conditions defined in Step (F).

The textile is then wound again as a roll.

The examples below illustrate some embodiments of the invention and are provided by way of non-limiting example.

EXAMPLES

Characterization of Materials and Methods (if not Indicated Differently)

The graphene used in the following examples consists of highly pure graphene nano-platelets, i.e. with a C/O ratio ≥100, and having the following dimensional characteristics: thickness (z) between 0.34 and 10 nm and lateral dimensions (x,y) between 400 and 5000 nm. This graphene is produced and marketed by Directa Plus S.p.A. with the G+® brand, hereinafter referred to as "G+" for the sake of brevity.

Surface resistivity (Standard: JIS K 7194)

A classification of materials based on surface resistivity is given in the table below:

| Classification | Description of the property | Surface resistivity ($\Omega/\square$) |
|---|---|---|
| Insulating material | Non-conductive material | $\geq 10^{11}$ |
| Antistatic material | Inhibits triboelectric (static electricity) charge generation effects | $10^8 \leq x \leq 10^{11}$ |
| Static dissipative material | Electrostatic charges dissipative | $10^5 \leq x \leq 10^8$ |
| Conductive material | Heating materials | $10 \leq x \leq 10^5$ |
| Highly conductive materials | Shielding materials | $\leq 10$ |

Thermal conductivity (ISO 22007-2)
Bacteriostaticity (ISO 20743: 2013
Antivirality (ISO 18184: 2019 or AATCC 100: 2012)
Rubbing fastness (UNI EN ISO 105-A03)

Example 1

Impregnation of Fabric
Composition of fabric: 100% viscose. Weight: 86 g/m2. Thickness: 200 μm
Composition of the Impregnation Bath:
Water
33.75 g/L G+
120 g/L polymeric binder PADDING FM-N
30 g/L anti-migration agent SINERGIL N30

Following impregnation according to the Steps (A)-(F), a further finishing process according to the steps (G)-(I) was carried out with a finishing bath containing 200 g/L of fixing agent Achifix MBH CONC to improve rub fastness.

The amount of bath absorbed by the sample during impregnation process (pick-up) was as follows:
Wet weight=10.83 g; Dry weight=6.26 g ◊ Pick-up= ((10.83−6.26)/6.26)×100=73%

The pick-up thus measured is the percentage by weight of bath absorbed per linear meter of fabric. Since treated viscose fabric had a height of 140 cm, the impregnation was of about 100 g of impregnation bath per linear meter of fabric, i.e., about 70 g/m2, which correspond to 2.85 g/m2 of graphene G+.

Post-Processing Characterization:
Surface resistivity after curing, before finishing: 6.7× $10^4 \Omega/\square$
Rubbing fastness before finishing: 3/4 dry; 1/2 wet
Surface resistivity after curing, after finishing: 3.2× $10^5 \Omega/\square$
Post-finishing rub resistance: 4/5 dry; 4 wet Post finishing thermal conductivity: 1.8 W/mK
Air passage: untreated fabric=22.34 Pa/cm2; impregnated fabric with G+=25.87 Pa/cm2
Antibacterial Properties:
  Untreated fabric: 0.6 for *Klebsiella pneumoniae* and 0.8 for *Staphylococcus aureus*.
  G+impregnated fabric: 4.5 for *Klebsiella pneumoniae* and 3.7 for *Staphylococcus aureus*.

Example 2

Impregnation of Fabric
  Composition of fabric: 100% cotton. Weight: 110 g/m2. Thickness: 193 µm. Height: 150 cm.
Composition of the Impregnation Bath:
  Water
  13.5 g/L G+
  120 g/L polymeric binder PADDING FM-N
  30 g/L anti-migration agent SINERGIL N30
  Following impregnation according to the Steps (A)-(F), a further finishing process according to the steps (G)-(I) was carried out with a finishing bath containing 100 g/L of fixing agent Achifix MBH CONC to improve rub fastness.
  The amount of bath absorbed by the sample during impregnation process (pick-up) was of 80% (88 g/m2)
  Quantity of graphene G+: 1.2 g/m2
Post-Processing Characterization:
  Surface resistivity after finishing: $3.35 \times 10^{11} \Omega/\square$
  Rubbing fastness after finishing: 5 dry; 4/5 wet
  Thermal conductivity: 1.8 W/mK
  Air passage: untreated fabric=11 Pa/cm2; fabric impregnated with G+=16.67 Pa/m2
Antibacterial Values:
  Untreated fabric: 0.7 for *Klebsiella pneumoniae* and 0.6 for *Staphylococcus aureus*.
  G+impregnated fabric: >6.3 for *Klebsiella pneumoniae* and 4.1 for *Staphylococcus aureus*.
Antivirality (ISO 18184: 2019):
  Untreated fabric: 38% reduction in viral load
  G+impregnated fabric: 98% reduction in viral load.

Example 3

Impregnation of a Felt
  Composition of felt: 100% Polyester. Weight: 112 g/m2. Thickness: 440 µm. Height: 150 cm.
Composition of the Impregnation Bath:
  Water
  13.5 g/L G+
  120 g/L polymeric binder PADDING FM-N
  30 g/L anti-migration agent SINERGIL N30
  Following impregnation according to the Steps (A)-(F), a further finishing process according to the steps (G)-(I) was carried out with a finishing bath containing 100 g/L of fixing agent Achifix MBH CONC to improve rubbing fastness.
  The amount of bath absorbed by the sample during impregnation process (pick-up) was of 80% (89.6 g/m2)
  Quantity of graphene G+: 1.2 g/m2
Post-Processing Characterization:
  Surface resistivity after finishing: $3.11 \times 10^{11} \Omega/\square$
  Rubbing fastness after finishing: 4 dry; 4/5 wet
  Thermal conductivity: 1.2 W/mK
  Air passage: untreated fabric=17 Pa/cm2; Fabric impregnated with G+=23 Pa/cm2
Antibacterial Values:
  Untreated fabric: Not Quantifiable for *Klebsiella pneumoniae* and for *Staphylococcus aureus*
  Fabric impregnated with G+>6.3 for *Klebsiella pneumoniae* and 4.3 for *Staphylococcus aureus*.

Example 4

Impregnation of a Spunbond Non-Woven
  Composition of non-woven: 100% Polypropylene. Weight: 30 g/m2. Thickness: 160 µm.
  Height: 150 cm.
Composition of the Impregnation Bath:
  Water
  4.05 g/L G+
  120 g/L polymeric binder PADDING FM-N
  30 g/L anti-migration agent SINERGIL N30
  Following impregnation according to the Steps (A)-(F), a further finishing process according to the steps (G)-(I) was carried out with a finishing bath containing 4.05 g/L of fixing agent Achifix MBH CONC to improve rub fastness.
  The amount of bath absorbed by the sample during impregnation process (pick-up) was of 80% (24 g/m2)
  Quantity of graphene G+: 0.09 g/m2
Post-Processing Characterization:
  Surface resistivity after finishing: $1.62 \times 10^{12} \Omega/\square$
  Rubbing fastness after finishing: 2/3 dry; 4/5 wet
  Thermal conductivity: 1.2 W/mK
  Air passage: untreated fabric=1.8 Pa/cm2; Non-woven impregnated with G+=2.86 Pa/cm2
Antibacterial Values:
  Untreated fabric: Not Quantifiable for *Klebsiella pneumoniae* and for *Staphylococcus aureus*
  Fabric impregnated with G+>5.8 for *Klebsiella pneumoniae* and 2.9 for *Staphylococcus aureus*.
  Antiviral values: (ISO 18184: 2019):
  Untreated non-woven: 35% reduction in viral load
  Non-woven impregnated with G+: 99.5% reduction in viral load.

Example 5

Fabric Impregnation
  MATERIAL: 97% cotton; 3% polyurethane fiber
  WEIGHT: 110 g/m²
  The fabric was impregnated with the method described above.
The Impregnation Bath was Composed of:
  Water
  4.05 g/L G+
  30 g/L polymeric binder PADDING FM-N
  3 g/L anti-migration agent SINERGIL N 30
  An impregnation of 75 g/m² was obtained, which corresponds to 0.30 g/m² of G+. Following impregnation according to the Steps (A)-(F), a further finishing process according to the steps (G)-(I) was carried out with a finishing bath containing 200 g/L of fixing agent Achifix MBH CONC to improve rub fastness.
  The characteristics obtained through the impregnation treatment were as follows:

| Cotton 110 g/m² | Surface resistivity | $3.35 \times 10^{11}$ Ohm/$\square$ | Standard: JIS K 7194 |
|---|---|---|---|
| | Thermal conductivity range | 1-4 W/mK | Standard: ISO 22007-2 |
| | Antibacterial activity* | *Staphylococcus Aureus*: 4.1 *Klebsiella Pneumoniae*: 6.3 | Standard: UNI EN ISO 20743: 2013 |

-continued

| | | |
|---|---|---|
| Respiratory resistance | Ref.: 14.22 Pa/cm$^2$ Inv.: 16.67 Pa/cm$^2$ | Standard: UNI EN 14683 Annex B (Chapter 5 Paragraph 2.2) |
| Bacterial filtration (BFE) Carried out by superimposing two layers | Ref.: 67% Inv.: 83% | UNI EN 14683: 2019 (Annex B) |

*The sample as is had poor antibacterial efficacy (S.Aureus = 0.6; K.Pneumoniae = 0.7)

Example 6

Impregnation of Multilayer Nonwoven

Composition of the sandwich: polypropylene fiber+cellulose fiber (core)+polypropylene fiber.

Weight: 150 g/m2 (50+50+50).

The material was impregnated with the methods described above.

The Impregnation Bath was Composed of:
Water
4.05 g/L G+
30 g/L polymeric binder PADDING FM-N
3 g/L anti-migration agent SINERGIL N 30

An impregnation of 95 g/m$^2$ was obtained, which corresponds to 0.38 g/m$^2$ of G+.

The characteristics obtained through the impregnation treatment with GNPs were as follows:

| | | | |
|---|---|---|---|
| Multilayer Nonwoven 150 g/m$^2$ | Surface resistivity | 2.83 × 10$^{11}$ Ohm/□ | Standard: JIS K 7194 |
| | Thermal conductivity range | 1-4 W/mK | Standard: ISO 22007-2 |
| | Respiratory resistance | Ref.: 16.2 Pa/cm$^2$ Inv.: 30 Pa/cm2 | Standard: UNI EN 14683 (Chapter 5 Paragraph 2.3) |
| | Bacterial filtration (BFE) | Ref.: 76% Inv.: 94% | UNI EN 14683: 2019 (Annex B) |

The invention claimed is:

1. A method for increasing the electrical and/or thermal conductivity, as well as the filtering power and the germ-blocking properties of a textile, comprising the steps of:
   a) preparing an impregnation composition consisting of a water dispersion comprising:
      from 1 to 65 g/L of graphene consisting of graphene nanoplatelets, in which at least 90% have a lateral dimension (x, y) from 50 to 50000 nm and a thickness (z) from 0.34 to 50 nm;
      from 10 to 500 g/L of a polymeric binder,
      from 1 to 50 g/L of an anti-migration and wetting agent,
   b) continuously stirring the impregnation composition in a stirring tank;
   c) feeding the impregnation composition into an impregnation tank to form an impregnation bath in the impregnation tank;
   d) providing a textile in the form of a roll, unwinding the roll and passing the textile in the impregnation bath until it is impregnated;
   e) passing the impregnated textile through at least a couple of squeezing rolls to remove excess impregnation bath;
   f) treating the textile of step e) in an oven to dry it at a temperature of between 100 and 200° C. to fix the composition on the textile;
   g) passing the textile of step f) through a finish bath in a finish tank, the finish bath comprising a fixing agent dispersed in water in an amount of from 1 to 300 g/L;
   h) passing the impregnated textile of step g) through at least two squeezing rolls to remove excess finish bath; and
   i) treating the textile of step h) in an oven to dry it at a temperature of between 100 and 200° C. to fix the fixing agent on the textile.

2. The method of claim 1, wherein the amount of fixing agent in the finish bath in the finish tank is from 2 to 250 g/L.

3. The method of claim 1, wherein the textile is selected from fabrics, nonwovens, and felts, alone or in combination.

4. The method of claim 1, wherein the graphene nano-platelets have a C/O ratio ≥100:1.

5. The method of claim 1, wherein the at least 90% of the graphene nano-platelets have a lateral dimension (x, y) from 100 to 10000 nm and a thickness (z) from 0.34 to 10 nm.

6. The method of claim 1, wherein the amount of graphene nano-platelets in the impregnation composition is from 2 to 40 g/L.

7. The method of claim 1, wherein the amount of polymeric binder in the impregnation composition is from 50 to 150 g/L.

8. The method of claim 1, wherein the amount of anti-migration and wetting agent in the impregnation composition is from 5 to 40 g/L.

9. A textile obtained with the method of claim 1, having an increased electrical and/or thermal conductivity, and/or an increased filtering power and/or germ-blocking properties.

10. The textile of claim 9, wherein the amount of fixing agent in the finish bath in the finish tank is from 2 to 250 g/L.

11. The textile of claim 9, wherein the textile is selected from fabrics, nonwovens, and felts, alone or in combination.

12. The textile of claim 9, wherein the graphene nano-platelets have a C/O ratio ≥100:1.

13. The textile of claim 9, wherein the at least 90% of the graphene nano-platelets have a lateral dimension (x, y) from 100 to 10000 nm and a thickness (z) from 0.34 to 10 nm.

14. The textile of claim 9, wherein the amount of graphene nano-platelets in the impregnation composition is from 2 to 40 g/L.

15. The textile of claim 9, wherein the amount of polymeric binder in the impregnation composition is from 50 to 150 g/L.

16. The textile of claim 9, wherein the amount of anti-migration and wetting agent in the impregnation composition is from 5 to 40 g/L.

* * * * *